United States Patent
Gurvich et al.

(10) Patent No.: US 12,258,122 B2
(45) Date of Patent: Mar. 25, 2025

(54) DRIVE SHAFT WITH BALLISTIC TOLERANCE

(71) Applicant: Goodrich Corporation, Charlotte, NC (US)

(72) Inventors: Mark R. Gurvich, Middletown, CT (US); Michael King, Sauquoit, NY (US); Brayton Reed, New York Mills, NY (US); Joyel M. Schaefer, Earlville, NY (US)

(73) Assignee: Goodrich Corporation

( * ) Notice: Subject to any disclaimer, the term of this patent is extended or adjusted under 35 U.S.C. 154(b) by 531 days.

(21) Appl. No.: 17/367,085

(22) Filed: Jul. 2, 2021

(65) Prior Publication Data
US 2023/0002039 A1 Jan. 5, 2023

(51) Int. Cl.
*B64C 27/12* (2006.01)
*F16C 3/02* (2006.01)
*B64C 27/82* (2006.01)

(52) U.S. Cl.
CPC .............. *B64C 27/12* (2013.01); *F16C 3/023* (2013.01); *F16C 3/026* (2013.01); *B64C 27/82* (2013.01); *F16C 2326/43* (2013.01)

(58) Field of Classification Search
CPC ......... B64C 27/12; B64C 27/82; F16C 3/023; F16C 3/026; F16C 2326/43
USPC ............................. 464/183; 244/60; 138/114
See application file for complete search history.

(56) References Cited

U.S. PATENT DOCUMENTS

| | | | | |
|---|---|---|---|---|
| 373,339 | A | * 11/1887 | Clifford | F16C 3/02 |
| | | | | 464/183 |
| 2,890,576 | A | * 6/1959 | Bentley, Jr. | E21B 17/00 |
| | | | | 464/183 |
| 3,580,214 | A | * 5/1971 | Muller | B63H 5/10 |
| 4,127,080 | A | * 11/1978 | Lakiza | F16C 3/023 |
| | | | | 464/183 |
| 5,724,643 | A | 3/1998 | Ewing | |

(Continued)

FOREIGN PATENT DOCUMENTS

| | | |
|---|---|---|
| EP | 0985837 A2 | 3/2000 |
| EP | 3617066 A1 | 3/2020 |
| EP | 3628588 A1 | 4/2020 |

OTHER PUBLICATIONS

Extended European Search Report for European Patent Application No. EP22182397.4, dated Nov. 9, 2023.

(Continued)

*Primary Examiner* — Greg Binda
(74) *Attorney, Agent, or Firm* — Kinney & Lange, P.A.

(57) ABSTRACT

An aircraft drive shaft that includes an outer shaft with a first diameter that is configured to couple a first gearbox and a second gearbox to provide power transfer between the two gearboxes. An inner shaft that is concentric with the outer shaft and has a second diameter that is configured to provide structural support to the outer shaft. A gap is located between an outer peripheral surface of the inner shaft and an inner peripheral surface of the outer shaft. The gap has a size from the outer peripheral surface to the inner peripheral surface that is at least as large as a largest ballistic projectile cross-section size that the aircraft is expected to encounter on an upcoming mission. A sleeve is located at least at a first end of the outer shaft and connects the outer shaft to the inner shaft.

10 Claims, 4 Drawing Sheets

(56) References Cited

U.S. PATENT DOCUMENTS

| | | |
|---|---|---|
| 6,918,839 B2 | 7/2005 | Holemans et al. |
| 7,882,932 B2 * | 2/2011 | Regonini ............. B64C 27/006 |
| 8,057,315 B2 | 11/2011 | Campbell |
| 2020/0063788 A1 | 2/2020 | Gurvich et al. |

OTHER PUBLICATIONS

Communication Pursuant to Article 94(3) for European Patent No. 22182397.4, Dated Jun. 26, 2024, 6 Pages.

* cited by examiner

DRIVE SHAFT WITH BALLISTIC TOLERANCE

BACKGROUND

Technological Field

The present disclosure relates generally to a drive shaft construction, and more specifically to design of drive shafts to withstand ballistic damage.

Description of Related Art

Post-ballistic behavior of rotary-wing (helicopter) or fixed-wing aircraft drive shafts is critical to being able to operate in hostile environments and being able to finish missions. Specifically, in a situation after ballistic damage, a damaged drive shaft has to maintain structural and functional integrity sufficient to complete the flight mission including safe landing. Although conventional design methods have generally been considered satisfactory for their intended purpose, there is still a need in the art for improved drive shafts that can better withstand ballistic damage and, especially, post-ballistic behavior. Therefore, the disclosure is focused on an efficient design of a drive shaft, capable of providing desired structural integrity even in case of the ballistic damage.

SUMMARY OF THE INVENTION

A drive shaft including an outer shaft having a first diameter, an inner shaft concentric with the outer shaft having a second diameter, and a gap between an outer surface of the inner shaft and an inner surface of the outer shaft. The gap is designed to be larger than an expected projectile cross-section area. The inner shaft can be connected to at least a first sleeve.

The outer shaft can be directly connected to at least a first sleeve. The inner shaft can be connected to a first sleeve, the outer shaft can be connected to a second sleeve, and the first and the second sleeves can be connected to each other. The inner shaft and outer shaft can be connected to each other, and the inner shaft can be connected to a sleeve, while the outer shaft can be not connected to the sleeve. The inner shaft and the outer shaft can be connected to each other, and the outer shaft can be connected to a sleeve while the first shaft is not connected to the sleeve. The inner shaft, the outer shaft, the first sleeve, and the second sleeve can be connected to each other. An inner surface of outer shaft can be connected to a first sleeve and an outer surface of the inner shaft can be connected to a second sleeve, and the inner surface of the outer shaft can be connected to the second sleeve and the outer surface of the outer shaft can be connected to a third sleeve, wherein each of the first, the second, and the third sleeves are each connected. The outer or the inner shaft can include a widening portion or a narrowing portion. The sleeve can include a widening or a narrowing portion.

It is also contemplated that the outer shaft can be directly connected to at least a first sleeve. The inner shaft can directly connected to a first sleeve, while the outer shaft can be directly connected to a second sleeve, and the inner and the outer shafts can be indirectly connected to each other.

It is further contemplated that the inner shaft and the outer shaft can be connected to each other, while the outer shaft can be flush against a sleeve where the first shaft does not contact the sleeve.

It is also contemplated that a sleeve having a first diameter greater than the diameter of the inner shaft, and a second diameter smaller than the diameter of the inner shaft can be used to connect the shafts to the rotor.

The drive shaft can include circumferential connectors between the inner shaft and the outer shaft. The connectors can include a portion extending axially and a portion extending radially.

A method of forming a drive shaft is also disclosed. The method includes defining an expected mission statement for a desired shaft, wherein the mission includes ballistic incidences, defining an expected ballistic diameter based on the ballistic incidences, defining an outer shaft having a first diameter, defining an inner shaft having a second diameter, and defining a gap between the inner surface of the outer shaft and the outer surface of the inner shaft, wherein the gap is larger than the diameter of the expected ballistic diameter. The mission plan includes more than one ballistic incidences, and expected ballistic diameter is defined as a maximum value among expected ballistic diameters corresponding to different incidences. The inner shaft of the drive shaft and the outer shaft of the drive shaft are formed of a fiber-reinforced polymer-matrix composite material or a metal or their combination.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
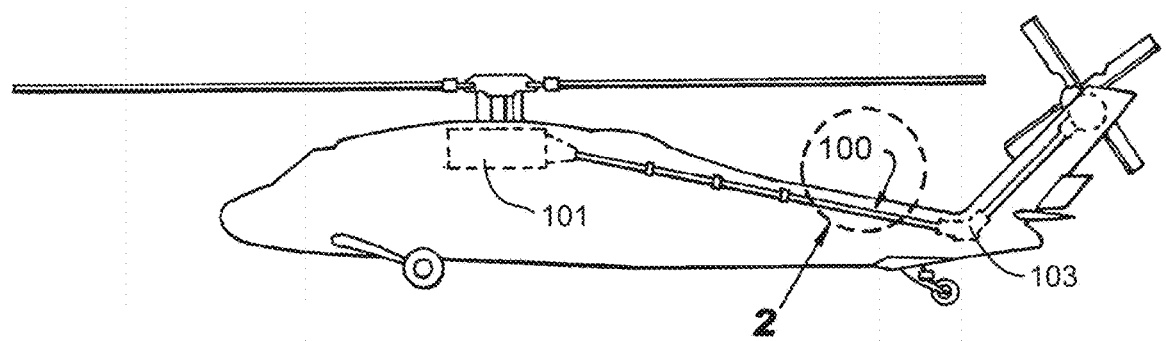
FIG. 1 is a cross-sectional schematic view of an exemplary embodiment of an aircraft with a drive shaft on example of a rotary-wing aircraft vehicle (helicopter)

Reference will now be made to the drawings wherein like reference numerals identify similar structural features or aspects of the subject disclosure. For purposes of explanation and illustration, and not limitation, a partial view of an exemplary embodiment of a drive shaft in accordance with the disclosure is shown in FIG. 1 and is designated generally by reference character 100. Other embodiments of the drive shaft, and methods of making such shafts in accordance with the disclosure, or aspects thereof, are provided in FIGS. 2-8, as will be described. The shafts, and methods of making such shafts described herein can be used for improving shaft reliability after ballistic damage.

Figure 2:
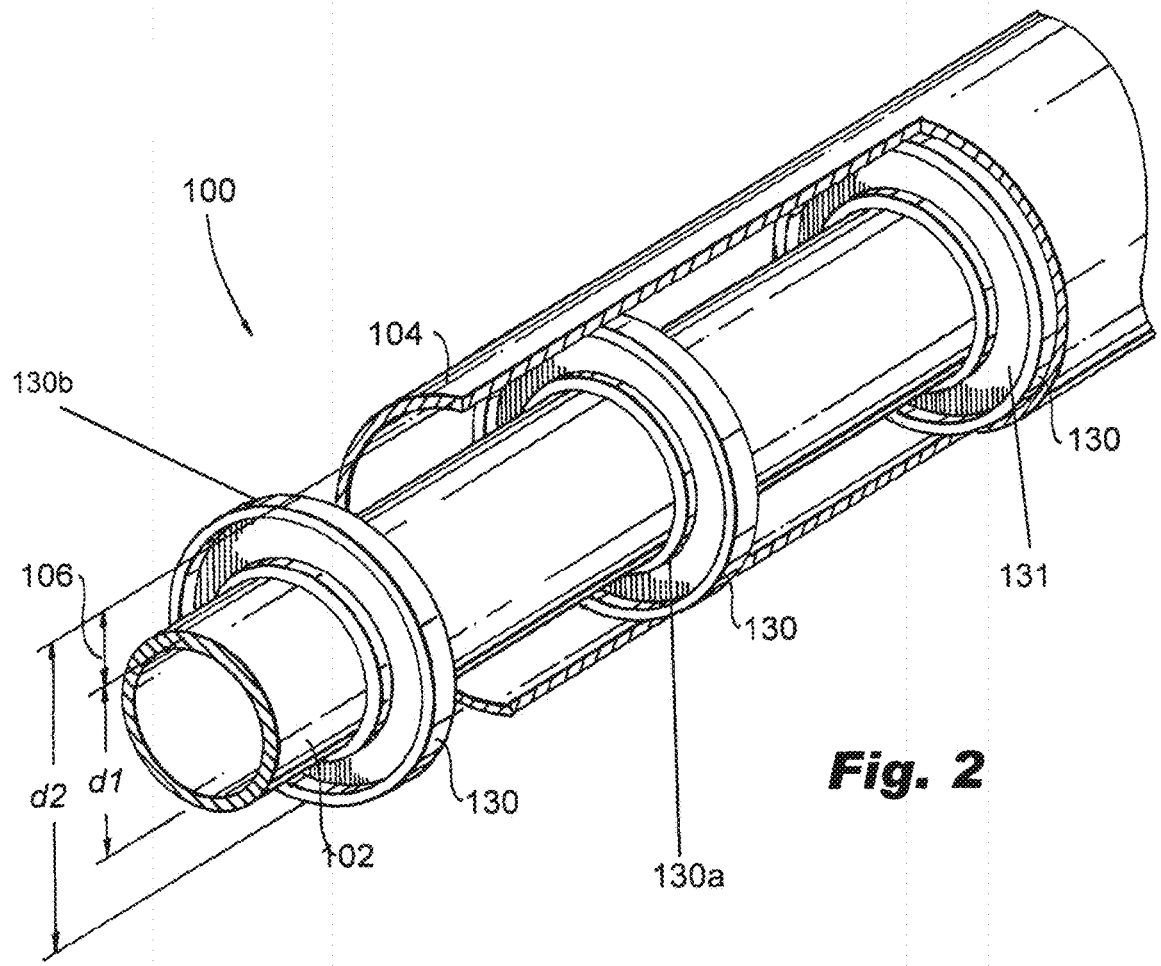
FIG. 2 is a perspective sectional view of the drive shaft of FIG. 1, showing a gap between an inner shaft and an outer shaft.

Referring now to FIG. 1, a helicopter is shown having a composite drive shaft 100 made of plural shaft elements or parts connecting a first gear box 101 connected to a main rotor and a second gear box 103 connected to a rear rotor. The drive shaft 100 includes an outer shaft connecting the first gear box 101 and the second gear box 103 for power transfer between the two gear boxes. The drive shaft 100, shown in detail at FIG. 2, is especially susceptible to ballistics from various sides and angles and can be damaged during missions. Maintaining structural and functional integrity sufficient to complete the flight mission including safe landing of the aircraft is of the upmost importance, as the aircraft cannot be operated once the structural integrity of the shaft is diminished.

Referring now to FIG. 2, a cross-section of the drive shaft 100 is shown. The drive shaft 100 includes an inner shaft 102 having a first diameter (d1) and an outer shaft 104 concentric with the inner shaft 102 and having a second diameter (d2). A gap 106 is defined between the outside peripheral surface of the inner shaft 102 and the inner peripheral surface of the outer shaft 104. The inner shaft 102 and the outer shaft 104 can be each formed of a fiber-reinforced polymer-matrix composite material or a metal or a metallic alloy or a combination thereof. Materials of the inner and outer shafts 102/104 can be the same or different from each other.

The gap 106 is dimensionally designed to be larger than an expected projectile cross-sectional size that the helicopter could encounter on its mission, providing increased ballistic tolerance for the aircraft as compared to prior art drive shafts with one tubular body. After an expected mission statement or project statement is developed for the aircraft, where the statement includes possible ballistic incidences, an expected ballistic cross-sectional size, based on caliber, is defined. The gap 106, is designed to be at least equal to the expected ballistic cross-sectional size, but taking safety factors into account the true gap is larger than the expected ballistic cross-sectional size. If the mission plan includes the potential to encounter more than one ballistic caliber, the expected ballistic cross-sectional size is defined based on the largest expected value of an expected ballistic cross-sectional size.

The drive shaft 100 also includes an optional plurality of circumferential connectors 130 that are located between and contacting the inner shaft 102 and the outer shaft 104. The connectors 130 are configured as circumferential beams. The beams can have different cross-sectional shapes, including, for example, I-shape, L-shape, U-shape, double L-shape, among others. An example shown in FIG. 2 illustrates an embodiment in form of a I-shape beam. The connector beam can have different portions, including, for example, a first portion extending axially 130a along the surface of the inner shaft 102, and a second portion extending axially 130b along the surface of the outer shaft 104 and a central web portion 131 extending radially between portions 130a and 130b. It is considered that first and second axial portions 130a and 130b can extend afterward or forward or both directions on each of the connectors, and that the connectors can also vary in shape.

Referring now to FIGS. 3-8, various embodiments of the inner shaft 102 and the outer shaft 104 are shown. Although each of the figures described below shows only a single end portion of the drive shaft 100, it should be understood by someone of ordinary skill in the art that each of the connections described below can be have a mirror connection on an opposite end of the drive shaft. Alternatively, one end portion of the drive shaft could have a first type of connection and the other end portion of the drive shaft could have a second type of connection, and these connections could be selected from any one of the connections described and illustrated herein without departing from the spirt or scope of the subject application.

Figure 3:
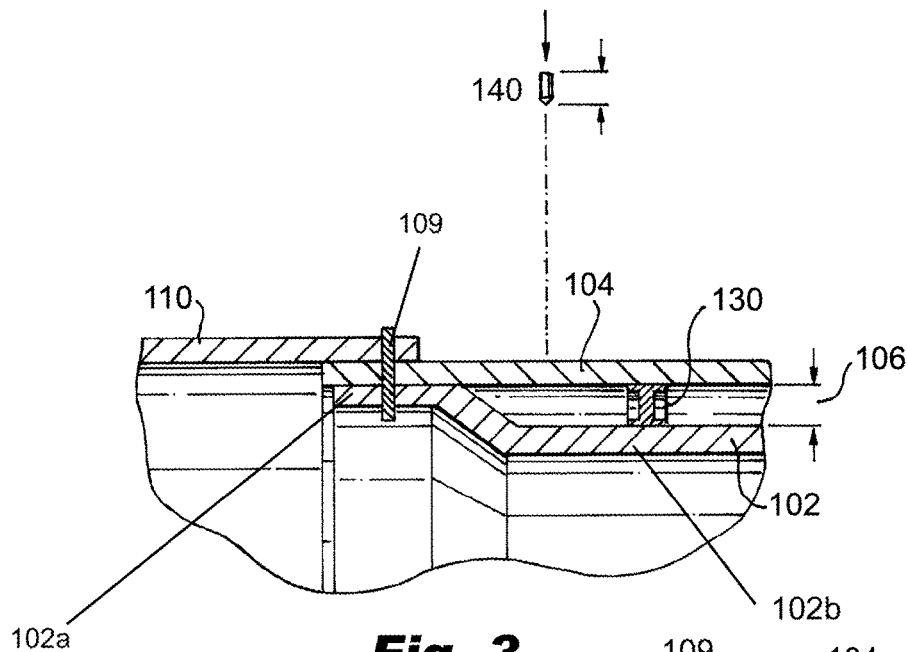
FIG. 3 is an axial cross-sectional view of a drive shaft of FIG. 2 showing a first embodiment of the inner and outer shafts connected to a single sleeve.

FIG. 3 shows the inner shaft 102 directly connected to a sleeve 110 by fasteners 109. The fasteners here and in the following FIGS. 4-8 are distributed uniformly in the hoop direction due to axisymmetric geometry of the shaft design. Thus, a term "set" of connection fasteners is considered for description of their plurality in the hoop direction. In this and other embodiments of the subject application, the fasteners 109 can include, rivets, bolts, or welded connections, among others. The fasteners 109 constitute a single and only connection set between the inner shaft 102, the outer shafts 104, and the sleeve 110 in this embodiment. Further shown, the inner shaft 102 includes a wider section 102a, and a narrower section 102b. The fasteners 109 are placed within the wider section 102a for making a connection to the sleeve 110 and the outer shaft 109. The sleeve 110 is placed on the outside of the outer shaft 104. Also shown is a representative ballistic projectile 140 directed at the shaft 100.

Figure 4:
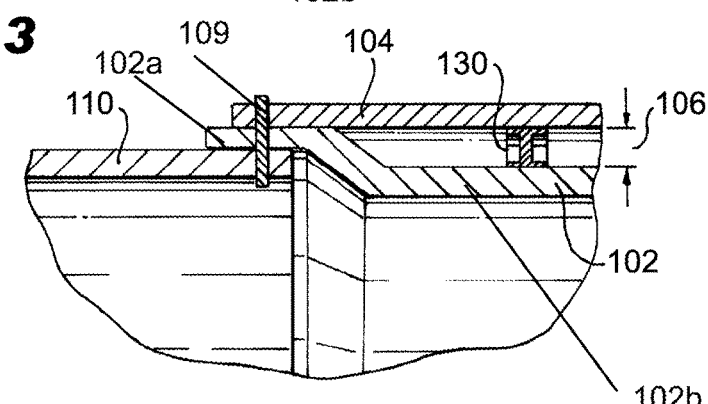
FIG. 4 is an axial cross-sectional view of a drive shaft of FIG. 2 showing another embodiment of the inner and outer shafts connected to a single sleeve.

FIG. 4 shows the inner shaft 102 directly connected to sleeve 110 by fasteners 109. In this embodiment the fasteners 109 also constitute a single and only connection set between the inner shaft 102, the outer shafts 104, and the sleeve 110. The outer shaft 104 is placed flush against a wider section 102a of the inner shaft 102, while the wider section 102a is placed flush against the sleeve 110. The sleeve 110 is placed inside of the wider portion 102a of the inner shaft 102, but it is located outside of the narrower section 102b of the inner shaft.

Figure 5:
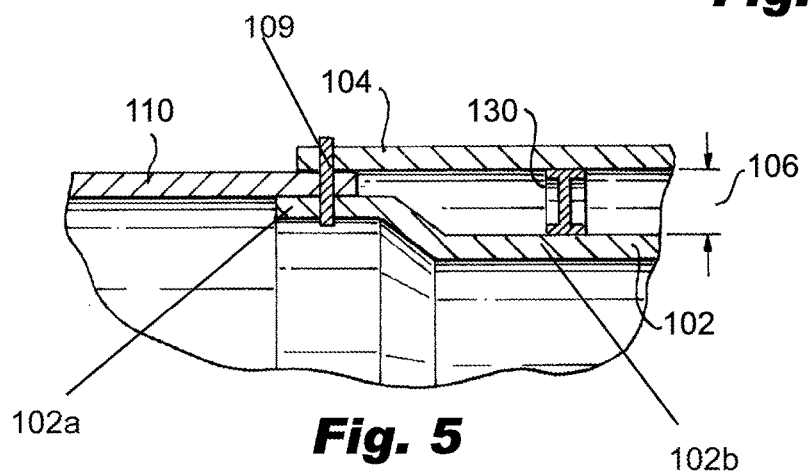
FIG. 5 is an axial cross-sectional view of a drive shaft of FIG. 2 showing another embodiment of the inner and outer shafts connected to a single sleeve.

FIG. 5 shows the inner shaft 102 and outer shaft 104 directly connected to sleeve 110 by fasteners 109. In this embodiment the fasteners 109 also constitute a single and only connection set between the inner shaft 102, the outer shaft 104, and the sleeve 110. The sleeve 110 is placed flush against a wider section 102a of the inner shaft 102, while the outer shaft 104 is placed flush against the sleeve 110. The sleeve 110 is placed outside of both the wider portion 102a of the inner shaft 102 and the narrower section 102b of the inner shaft.

Figure 6:
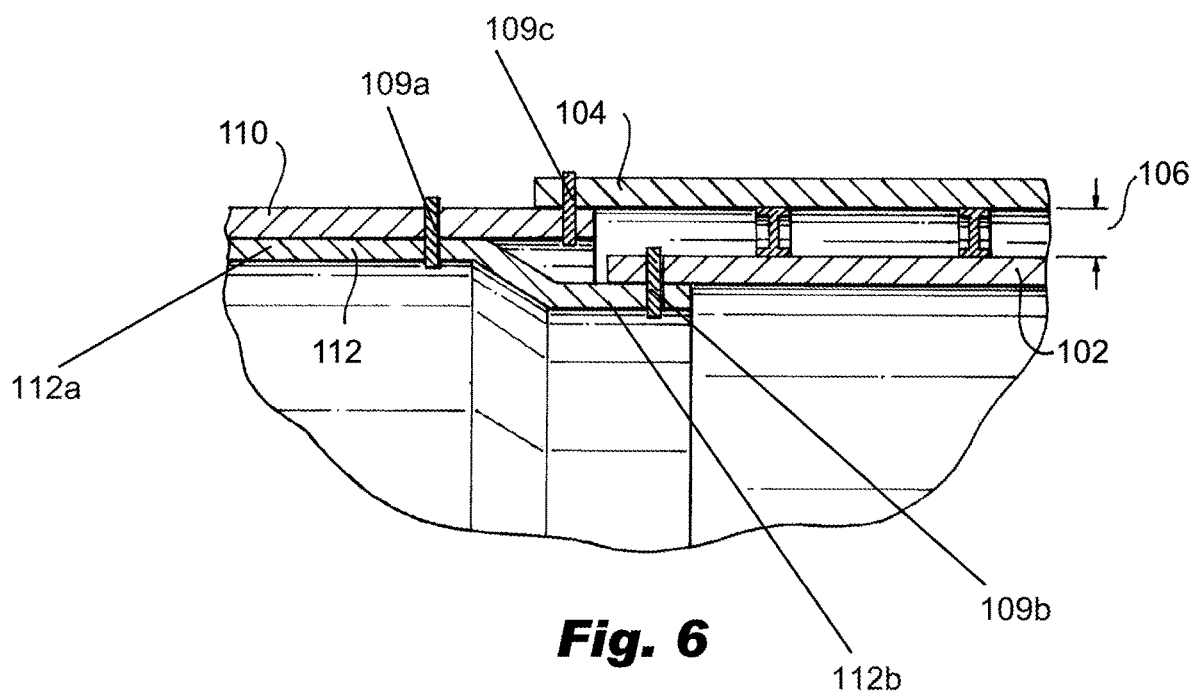
FIG. 6 is an axial cross-sectional view of a drive shaft of FIG. 2 showing an embodiment of the inner and outer shafts along with two sleeves.

FIG. 6 shows an embodiment having two sleeves, an inner sleeve 112, and an outer sleeve 110. The inner shaft 102 connected to the inner sleeve 112 by fasteners 109b. The inner shaft 102 and the outer shaft 104 remain not connected directly. The outer shaft 104 is attached to the outer sleeve 110 by fasteners 109c. While the inner sleeve 112, which includes a widening section 112a, is directly connected to the outer sleeve 110 by fasteners 109a. The wider section of the inner sleeve 112a is flush against the outer sleeve 110, while the narrower portion of the sleeve 112b is adjusted to an inner surface of the inner shaft 102.

Figure 7:
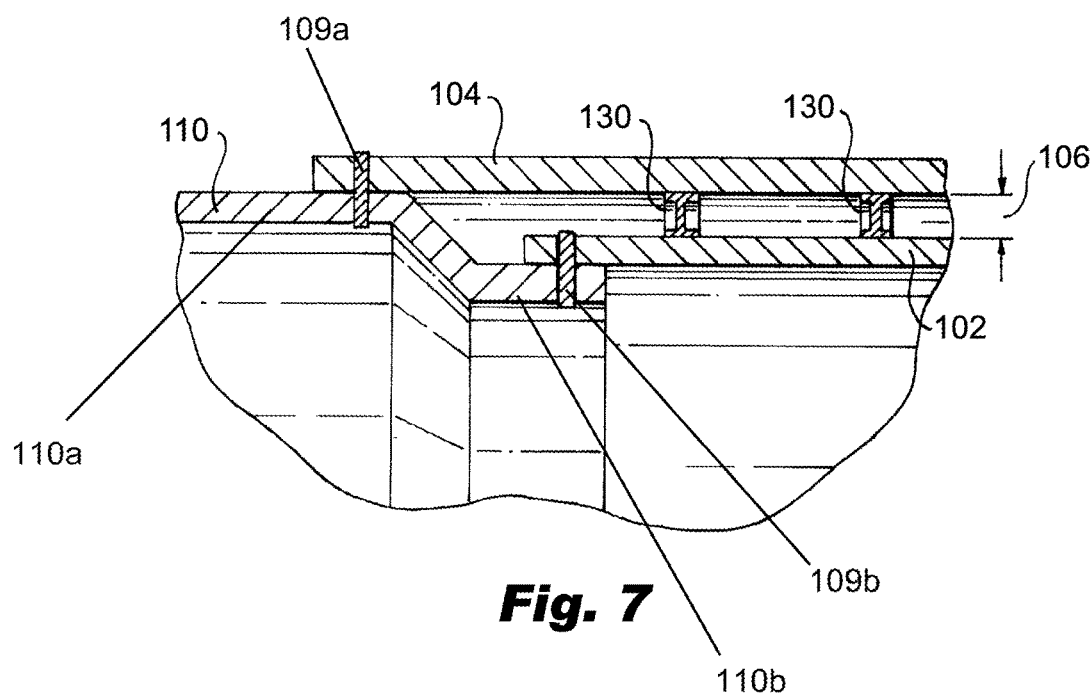
FIG. 7 is an axial cross-sectional view of a drive shaft of FIG. 2 showing another embodiment of the inner and outer shafts connected to a single sleeve.

FIG. 7 shows an embodiment having a single narrowing sleeve 110 that has a wider section 110a and a narrower section 110b. The inner shaft 102 is connected to the narrower section 110b by fasteners 109b. The inner shaft 102 and the outer shaft 104 remain not connected directly. The outer shaft 104 is shown directly connected to the wider section of the sleeve 110a by fasteners 109a.

Figure 8:
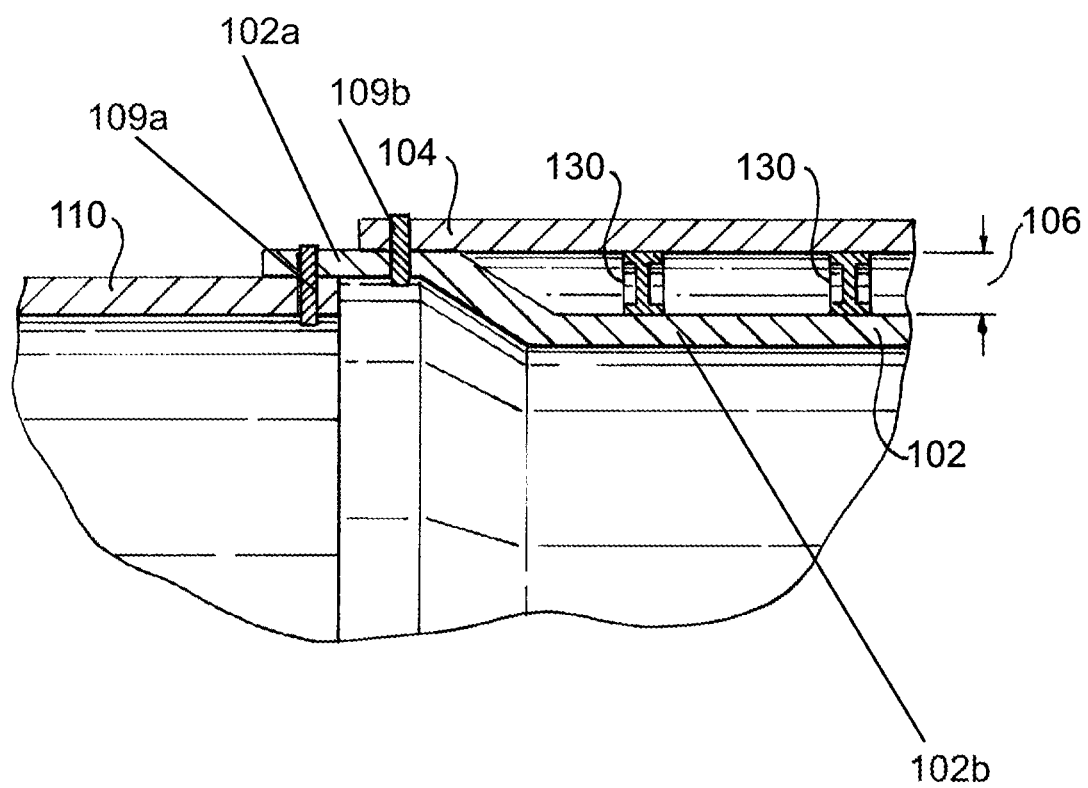
FIG. 8 is an axial cross-sectional view of a drive shaft of FIG. 2 showing another embodiment of the inner and outer shafts connected to a single sleeve.

FIG. 8 shows the inner shaft 102 directly connected to sleeve 110 by fasteners 109a and the outer shaft 104 connected to inner shaft by fasteners 109b. The outer shaft 104 is placed flush against a wider section 102a of the inner shaft 102, while the wider section 102a is placed flush against the sleeve 110. The sleeve 110 is placed inside of the wider portion 102a of the inner shaft 102, but is located outside of the narrower section 102b of the inner shaft.

In the above examples (FIGS. 3-8), sleeves can be made of either metals or metallic alloys or fiber-reinforced polymer-matrix composites or their combinations. The connectors between the outer and inner shafts can be made of polymeric materials, fiber-reinforced polymer-matrix composites, metals or alloys or any of their combinations.

A method of forming a drive shaft 100 is also disclosed which includes defining an expected mission statement for a desired shaft, wherein the mission includes ballistic incidences, defining an expected ballistic cross-sectional size based on the ballistic incidences. The method further includes defining an inner shaft 102 having a first diameter (d1), defining an outer shaft 102 having a second diameter (d1), and defining a gap 106 between the inner surface of the outer shaft 104 and the outer surface of the inner shaft 102 wherein the gap 106 is larger than the cross-sectional size of the expected ballistic projectile.

The methods and systems of the present disclosure, as described above and shown in the drawings, provide for a helicopter drive shaft capable of withstanding ballistic damage and operating as intended better than conventional drive shafts. Further benefits include, increased ballistic resilience in combat conditions, reduced weight, increased limit load or/and remaining flight life after a ballistic damage.

While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An aircraft drive shaft comprising:
    an outer shaft having a first diameter connected to a first gearbox and a second gearbox to provide power transfer between the two gearboxes;
    an inner shaft concentric with the outer shaft and having a second diameter configured to provide structural support to the outer shaft;
    a gap defined between an outer peripheral surface of the inner shaft and an inner peripheral surface of the outer shaft, wherein;
    a sleeve located at least at first end of the outer shaft connecting the outer shaft to the inner shaft; and
    a plurality of connectors within the gap between the inner shaft and the outer shaft, wherein each connector of the plurality of connectors comprises:
        a first portion contacting the inner shaft and extending axially along a surface of the inner shaft;
        a second portion contacting the outer shaft and extending axially along a surface of the outer shaft; and
        a central web portion extending radially between the first portion and the second portion.

2. The drive shaft of claim 1, wherein the sleeve includes a first sleeve and a second sleeve and wherein the inner shaft is directly connected to at least the first sleeve, and the outer shaft is directly connected to at least the first sleeve.

3. The drive shaft of claim 1, wherein the sleeve includes a first sleeve and a second sleeve and the inner shaft is directly connected to the first sleeve, the outer shaft is directly connected to the second sleeve, and the first sleeve and the second sleeve are connected to each other.

4. The drive shaft of claim 1, wherein the inner shaft and outer shaft are directly connected to each other, and the inner shaft or the outer shaft is directly connected to the sleeve.

5. The drive shaft of claim 1, wherein the inner shaft and the outer shaft are connected to each other, and the outer shaft is flush against the sleeve while the first shaft does not contact the sleeve.

6. The drive shaft of claim 1, wherein the sleeve includes a first sleeve and a second sleeve and wherein the inner shaft, the outer shaft, the first sleeve, and the second sleeve are connected to each other.

7. The drive shaft of claim 1, wherein the sleeve is at least partially located between the inner shaft and the outer shaft.

8. The drive shaft of claim 1, wherein the inner shaft or/and the outer shaft includes a widening portion or/and a narrowing portion.

9. The drive shaft of claim 1, wherein the sleeve is connected to at least one of the inner shaft and the outer shaft and includes a widening portion or/and a narrowing portion.

10. The drive shaft of claim 1, wherein each connector of the plurality of connectors extends 360 degrees circumferentially within the gap.

* * * * *